United States Patent [19]

Dalens et al.

[11] 4,221,830

[45] Sep. 9, 1980

[54] METHOD FOR PRODUCING ANTISTATIC SYNTHETIC POLYMER FILM, ARTICLE MADE THEREBY, AND METHOD OF USE

[75] Inventors: Marcel Dalens, Carmaux; Armand Haas, Mazingarbe, both of France

[73] Assignees: Societe des Plastiques de Carmaux SCASAR; Societe Chimique des Charbonnages CdF Chimie

[21] Appl. No.: 748,214

[22] Filed: Dec. 7, 1976

[30] Foreign Application Priority Data

Oct. 24, 1975 [FR] France .................. 75 32697

[51] Int. Cl.$^2$ .................. B05D 5/12; B32B 27/14
[52] U.S. Cl. .................. 427/256; 47/17; 47/DIG. 7; 252/512; 260/DIG. 16; 427/401; 428/208; 428/209; 428/461; 428/476.9
[58] Field of Search .................. 252/512; 427/390 B, 427/96, 256, 383 R; 428/922, 328, 461, 476.9, 208, 209; 47/17, DIG. 7; 260/DIG. 16

[56] References Cited

U.S. PATENT DOCUMENTS

| | | | |
|---|---|---|---|
| 2,941,254 | 6/1960 | Swerlick | 427/256 X |
| 3,446,651 | 5/1969 | Clachan et al. | 428/922 X |
| 3,493,369 | 2/1970 | Busch et al. | 252/512 X |
| 3,582,448 | 6/1971 | Okuhashi et al. | 428/922 X |
| 3,718,533 | 2/1973 | Shibata | 47/17 X |
| 3,846,140 | 11/1974 | Youtsey et al. | 106/20 |
| 3,968,056 | 7/1976 | Bolon et al. | 252/512 X |

FOREIGN PATENT DOCUMENTS

| | | | |
|---|---|---|---|
| 85118 | of 1971 | German Democratic Rep. | 427/96 |
| 46-17353 | of 1971 | Japan | 427/79 |
| 49-110425 | of 1974 | Japan | 252/511 |
| 7019044 | of 1972 | Netherlands | 427/256 |
| 869295 | of 1961 | United Kingdom | 427/383 R |

*Primary Examiner*—Evan K. Lawrence
*Attorney, Agent, or Firm*—Finnegan, Henderson, Farabow, Garrett & Dunner

[57] ABSTRACT

A method for producing an antistatic film of a synthetic polymer consisting essentially of continuously printing over at least part of the surface of at least one side of the film with aluminum powder by suspending in solvent a composition consisting essentially of aluminum powder and a polyamide resin, setting the suspension down onto the film, and permitting the solvent to evaporate The films obtained have a surface resistivity of less than $10^{10}$ ohms/cm and are useful, in addition to conventional uses such as packaging, for preventing virus degeneration of plants by virus-carrying aphides by mulching the plants with the films, limiting the increase in soil temperature in warm environments by mulching the soil with the films, and reducing the calorific energy necessary to heat greenhouses with the films.

5 Claims, No Drawings

METHOD FOR PRODUCING ANTISTATIC SYNTHETIC POLYMER FILM, ARTICLE MADE THEREBY, AND METHOD OF USE

BACKGROUND OF THE INVENTION

The present invention relates to a method for the production of antistatic films of synthetic polymers, to the products obtained by this method, and to some applications of the products.

It is known that synthetic polymers, owing to their non-conductivity, readily acquire but do not easily lose static electrical charges. The generation of static electricity onto the surface of plastic materials may occur in several ways during the period extending from their production to their final use. One way is through the friction caused by extrusion or even through pulling a film over the rollers of a packaging machine.

Static electricity has detrimental effects in various applications of synthetic polymers. In the packaging industry, first it causes the attraction of dust which ruins the clarity of a polymer film, secondly, it causes handling problems which result from the polymers adhering to metal parts of the packaging machine, and thirdly it causes electrical discharges which may start a fire and/or explosion.

Previously, two means have been proposed for resolving these problems. The first means is the use of air-ionizing bars which provide negative and positive ions that neutralize the plastic. This is an effective means of reducing fire and explosion hazards, but provides only temporary protection. The second means is the incorporation into the synthetic polymer of antistatic chemical agents such as quaternary ammonium compounds, phoshate esters, and polyglycol esters of fatty acids which are hygroscopic and remain on the polymer surface. Nevertheless, depending on the method of incorporation used, they have the disadvantage of being easily removed from the plastic surface by handling or cleaning or of only producing their effect for several days or several weeks after incorporation. On the other hand, when used for packaging food, there is a danger of their coming into contact with the food, making it unsuitable for consumption, and their presence reduces some polymer properties such as heat sealibility and printability. Furthermore, surface resistivity of polymers comprising such agents cannot be reduced below $10^{10}$ ohms/cm, whereas surface resistivity of unmodified polymers is about $10^{16}$ to $10^{18}$ ohms/cm.

SUMMARY OF THE INVENTION

Thus, particularly in the packaging industry, there is a need for a method of producing antistatic films from synthetic polymers, making it possible to obtain products that are suitable for packaging food and whose resistivity is less than $10^{10}$ ohms/cm. Therefore, the first object of this invention is to provide a new method avoiding the known disadvantages of current methods for the production of antistatic films of plastic material. In addition, the second object of the invention is to provide films of synthetic polymers, having from the moment of their manufacture, improved properties, in particular low resistivity, that remain throughout their useful life.

Additional advantages will become apparent from the following description, or may be deduced from the practice of the invention. They are achieved by means of the products and methods claimed. To achieve the aforesaid objects, the invention provides for continuously printing over at least part of the surface of a film of synthetic polymer with a conducting powder, wherein the synthetic polymer is selected from low density polyethylene, high density polyethylene, polypropylene, and polybutene-1 and wherein the conducting powder is aluminum powder. More precisely, the method consists essentially of continuously printing over at least part of the surface of at least one side of the polymer film with aluminum powder by suspending in solvent a composition consisting essentially of aluminum powder and a polyamide resin, setting the suspension down onto the film, and permitting the solvent to evaporate. The solvent is constituted by a mixture of isopropyl alcohol, petrol, and possibly dry butanol.

The expression "the surface of a film" means the surface of at least one side of a film.

DESCRIPTION OF THE PREFERRED EMBODIMENTS

The following description is intended to make the invention easier to understand, but it should not be interpreted as limiting it.

The synthetic polymers which may be used in the method according to the invention are particularly preferred over non-olefinic polymers such as polyvinyl-chloride and cellophane, especially in view of the surface resistivity that can be achieved.

The method according to the invention may be used with flexographic printing as well as with heliographic printing, so-called transfer helio or direct helio. The choice of the printing method will depend on the width of the film and on the consumption of ink comprising aluminum powder which may be allowed for a given cost. Aluminum powder of low mean grain size is preferred.

The method described above is particularly advantageous both from the practical as well as the economical point of view since it uses well known techniques and facilitates a reduction in the cost of the films without loss of quality compared to methods using ionization of air or the incorporation of chemical agents.

Furthermore, the heat sealibility of the polymer film is not affected and the problem of the contact of surface chemical agents with food is avoided. The electrical properties of the film obtained according to the invention are better than those of antistatic films obtained by conventional methods. Thus, the resistivity may be reduced to $10^8$ ohms/cm and possibly to even lower values. On the other hand, these electrical properties are achieved at once and are maintained satisfactorily in the course of time.

The products obtained by the method according to the invention have been tested in some agricultural applications, which have no relation at all with their first packaging object. It has been found unexpectedly that they show under certain conditions remarkable properties which make them useful in the field of agriculture. Thus, it is a well known problem for cultivators to exterminate aphides which act as vehicles of the virus degeneration of some plants. It has been found that by covering plants exposed to that phenomenon with films according to the invention, there is achieved an important increase of their output due to a powerful repulsive effect towards aphides. These films can therefore be benefically used for the mulching of late autumn cultures such as tomatoes, pimentoes, marrows, etc.

In another field, moreover, it has been found that mulching with films according to the invention shows specific advantages in countries with warm environments in order to limit the increase in soil temperature. It has also been found that part of the calorific energy necessary for heating greenhouses can be saved by covering the greenhouses by means of films according to the invention.

To illustrate the invention more concretely, reference is made to the following example, which should not be taken as limiting the scope and general principles of the invention.

EXAMPLE

A solvent mixture is prepared comprising by weight 63% isopropyl alcohol, 32% petrol, and 5% dry 1-butanol. A composition of 80% by weight polyamide resin and 20% by weight of an aluminum powder having a mean grain size of 6 microns, a covering power of 30,000 cm$^2$/g, and whereof 0.1% of the grains have a diameter greater than 45 microns is put into suspension in this solvent mixture. The resulting suspension is set down onto a film of low density polyethylene having a thickness of 50 microns and a width of 1.20 meters by the flexographic printing method. Then the solvent mixture is evaporated.

The resistivity of the film is measured in conventional manner by applying a known voltage to the latter and reading off the value of the intensity of the current. The surface resistivity of the sample thus prepared by the method of the invention is $10^8$ ohms/cm.

What is claimed is:

1. The method of producing an antistatic film of synthetic polymer consisting essentially of continuously printing over at least part of the surface of at least one side of the film with aluminum powder by suspending in solvent a composition consisting essentially of aluminum powder and a polyamide resin, setting said suspension down onto said film, and permitting said solvent to evaporate, said synthetic polymer of said antistatic film being selected from the group consisting of low density polyethylene, high density polyethylene, polypropylene, and polybutene.

2. The method according to claim 1, wherein said printing is flexographic printing, transfer helio printing, or direct helio printing.

3. The method according to claim 1, wherein said solvent comprises isopropyl alcohol.

4. The method for reducing the calorific energy necessary to heat greenhouses, comprising covering said greenhouse with films obtained according to the method of claim 1.

5. Films obtained according to the method of claim 1, having a surface resistivity less than $10^{10}$ ohms/cm.

* * * * *